United States Patent [19]
Correnti et al.

[11] Patent Number: 5,394,547
[45] Date of Patent: Feb. 28, 1995

[54] DATA PROCESSING SYSTEM AND METHOD HAVING SELECTABLE SCHEDULER

[75] Inventors: Joseph A. Correnti, Boca Raton; Ralph M. Pipitone, Boynton Beach, both of Fla.; Michael W. Thomas, Bellevue, Wash.

[73] Assignee: International Business Machines Corporation, Armonk, N.Y.

[21] Appl. No.: 815,104

[22] Filed: Dec. 24, 1991

[51] Int. Cl.⁶ ............................................. G06F 9/46
[52] U.S. Cl. .......................... 395/650; 364/DIG. 1; 364/281.3; 364/281.4; 364/281.8; 395/700; 395/775
[58] Field of Search ........................ 395/650, 700, 725; 364/200, 281.3, 281.4, 281.8

[56] References Cited

U.S. PATENT DOCUMENTS

| | | | |
|---|---|---|---|
| 4,642,756 | 9/1987 | Sherrod | 364/200 |
| 4,736,318 | 4/1988 | Delyani et al. | |
| 4,833,594 | 5/1989 | Familetti et al. | |
| 4,886,941 | 5/1989 | Davis et al. | 178/18 |
| 4,890,227 | 12/1989 | Watanabe et al. | |
| 4,908,750 | 3/1990 | Jablow | |
| 5,129,086 | 6/1992 | Coyle, Jr. et al. | 395/650 |
| 5,179,702 | 8/1993 | Spix et al. | 395/650 |
| 5,270,920 | 4/1993 | Pearse et al. | 364/401 |
| 5,325,526 | 6/1994 | Cameron et al. | 395/650 |

OTHER PUBLICATIONS

Gait, J.; "An Adaptive Two Tier Scheduler for Partitioned Multiprocessing"; Proceedings Supercomputing '88; vol. 3; pp. 144–150.
Nishio, S., et al.; "Performance Evaluation On Several Cautious Schedulers For Database Concurrency Control"; *Database Machines And Knowledge Base Machines;* pp. 157–200; 1987.
Hoang, Phu; "Compiling Real-Time Digital Signal Processing Applications Onto Multiprocessor Systems"; Univ. of Calif., Berkeley; 1992; PhD. Thesis.
Gait, Jason; "An Adaptive Two Tier Scheduler for Partitioned Multiprocessing"; Textronix Laboratories; 1988.
Nishio, et al.; "Performance Evaluation on Several Cautious Schedulers for Database Concurrency Control"; Kyoto U., Kyoto, Japan; 1987.

*Primary Examiner*—Kevin A. Kriess
*Assistant Examiner*—Jonathan Hall Backenstose
*Attorney, Agent, or Firm*—Bruce D. Jobse; Andrew J. Dillon

[57] ABSTRACT

An improved data processing system and operating system having a selectable scheduler. An operating system kernel is provided having a standardized interface for permitting the installation of a selected one of multiple diverse schedulers for use in different environments. System resources which may include memory, input/output devices and file systems are thereafter optimally allocated for a selected set of applications and a particular environment within the data processing system by permitting a user to install a selected one of the multiple schedulers which directly controls allocation of processor time, thereby indirectly allocating system resources. The standardized interface within the operating system kernel is preferably provided utilizing a kernel extension mechanism and installation of a selected one of the multiple schedulers may occur automatically, in response to system initialization, or may be selectively achieved during operation of the data processing system.

10 Claims, 2 Drawing Sheets

DATA PROCESSING SYSTEM AND METHOD HAVING SELECTABLE SCHEDULER

BACKGROUND OF THE INVENTION

1. Technical Field

The present invention relates in general to improvements in operating systems and data processing systems, and in particular to enhancements in operating system and data processing system efficiency in utilization of system resources. Still more particularly, the present invention relates to a method and system for enhancing the efficiency of the allocation of system resources in a data processing system by permitting an operating system to utilize multiple selectable schedulers.

2. Description of the Related Art

Modern data processing systems typically permit a multitude of programs or applications, each having multiple processes and/or threads, to be present within memory at the same time, permitting the central processing unit to be shared by those programs. This technique improves the efficiency of the computer system by permitting more "throughput" in that more tasks may be accomplished in less time. Such techniques result in highly efficient utilization of a central processing unit.

The objective of such systems is to have a task running at all times, in order to maximize utilization of the central processing unit. Therefore, if there is more than one task desired at a particular time, one task is processed while the remainder wait until the processor is free and can be rescheduled. It should therefore be apparent that means must be provided for deciding which pending task will next receive the service of the central processor. This is typically a function of the scheduling and dispatching portions of an operating system.

Many scheduling methods are known in the prior art. Typical examples include the provision of a plurality of queues of different priorities, tasks which are assigned based upon user determined priorities which determine the initial queue assignment. Other examples include straightforward First-Come First-Served, or Shortest-Job-First schedulers.

Schedulers are typically included within operating system kernels and often combined with the dispatcher. This situation makes modification of a scheduler for different environments difficult and further prevents scheduler modifications by anyone who does not have rights to access the kernel source code.

This becomes a problem due to the fact that operating system kernels may need to run in many different environments. The same operating system kernel may also run on many different hardware platforms and in multiple operating environments. It is also possible for an operating system to be utilized as a base to run software written for another operating system.

The different environments in which an operating system kernel may run can result in a situation in which different schedulers would be necessary for each environment and useful in order to optimize system resource allocation. For example, an interactive environment may require a time sharing scheduler which fairly allocates central processing unit time between processes, threads, or users. A manufacturing environment may require a real time scheduler, which gives central processing unit time to a process immediately, upon the occurrence of some event.

It should therefore be apparent that operating system and data processing system efficiency, portability, and utility may be greatly enhanced by providing an operating system kernel which may utilize multiple diverse schedulers in order to optimize allocation of system resources and allow correct operation of different types of applications on data processing systems which include that operating system kernel.

SUMMARY OF THE INVENTION

It is therefore one object of the present invention to provide an improved operating system and data processing system.

It is another object of the present invention to provide an improved operating system and data processing system which permit enhanced efficiency in the utilization of system resources.

It is yet another object of the present invention to provide an improved operating system and data processing system which enhances the efficiency of the allocation of system resources by permitting an operating system to utilize multiple selectable schedulers.

It is another object of the present invention to provide an improved operating system kernel which may be utilized without modification in a plurality of different operating environments.

The foregoing objects are achieved as is now described. An operating system kernel is provided having a standardized interface for permitting the installation of a selected one of multiple diverse schedulers for use in different environments. System resources which may include memory, input/output devices and file systems are thereafter optimally allocated for a selected set of applications and a particular environment within the data processing system by permitting a user to install a selected one of the multiple schedulers which directly controls allocation of processor time, thereby indirectly allocating system resources. The standardized interface within the operating system kernel is preferably provided utilizing a kernel extension mechanism and installation of a selected one of the multiple schedulers may occur automatically, in response to system initialization, or may be selectively achieved during operation of the data processing system.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
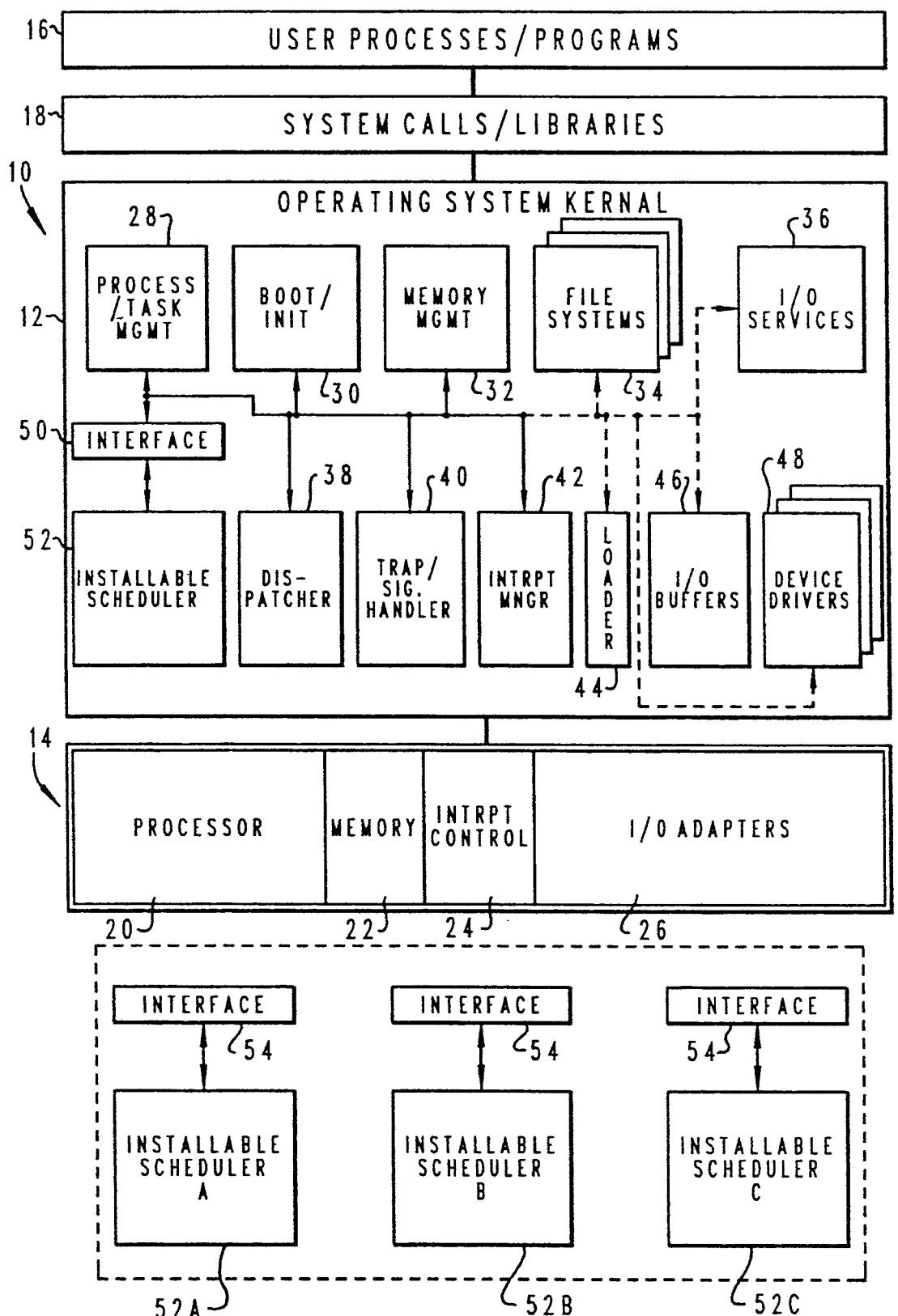
FIG. 1 is a high level block diagram illustrating software and hardware components of a data processing system which may be utilized to implement the method and system of the present invention.

With reference now to the figures and in particular with reference to FIG. 1, there is depicted a high level block diagram illustrating software and hardware components of a data processing system 10 which may be utilized to implement the method and system of the present invention. As is illustrated, the data processing system includes an operating system kernel 12 which is coupled to hardware system 14. Hardware system 14 preferably includes the hardware elements of data processing system 10 and depicted within FIG. 1 are processor 20, memory 22, interrupt controller 24 and input/output adapters 26.

Also depicted within FIG. 1 are user processes/programs 16 which, in a manner well known to those skilled in the art, access selected procedures within operating system kernel 12 by means of system "calls" which are depicted at reference numeral 18. As is typical in such systems selected procedures within operating system kernel 12 are designed to be called or invoked by applications within data processing system 10 and thereafter the task will return to the user program which invoked the operating system kernel procedure.

In this manner, the operating system kernel acts as an interface between the user of data processing system 10 and hardware system 14. Operating system kernel 12 is utilized to provide an environment in which various processes or programs may be executed. The utilization of an operating system is necessary in order to utilize hardware system 14 in an efficient manner and to prevent user programs from interfering with the proper operation of data processing system 10, by controlling the creation and alteration of files, the control of input/output devices and the provision of multiple device drivers which permit data processing system 10 to interface with various external devices.

Still referring to FIG. 1, it may be seen that operating system kernel 12 includes multiple subsystems which are utilized by operating system kernel 12 to efficiently operate data processing system 10. For example, operating system kernel 12 includes process/task management system 28 which is a portion of operating system kernel 12 which is utilized to prove task creation, deletion, status and synchronization functions within data processing system 10. Next, boot/initialization system 30 is illustrated. Boot/initialization system 30 is preferably utilized to prepare data processing system 10 for operation.

Next, memory management system 32 is depicted. Those skilled in the art will appreciate that memory management is utilized to allocate and deallocate memory within data processing system 10.

Next, file systems 34 are depicted. File systems 34 are preferably utilized to control the creation and deletion of files within data processing system 10. Another aspect of file systems typically addressed within an operating system kernel is access control. Access control is utilized to ensure that an access to a file or directory within data processing system 10 is checked for correctness. Next, input/output services system 36 is depicted. Input/output services system 36 is preferably a functional unit within operating system kernel 12 which controls one or more units of peripheral equipment.

Next, in accordance with an important feature of the present invention, dispatcher 38 is depicted within operating system kernel 12. Unlike systems in which a dispatcher is combined with a scheduler, operating system kernel 12 depicted within FIG. 1 separately sets forth dispatcher 38, in order to permit various diverse schedulers to be selectively installed within operating system kernel 12 in a manner which will be explained in greater detail herein. Dispatcher 38 is preferably a subsystem within operating system kernel 12 which places jobs or tasks into execution. Dispatcher 38 is thus responsible for providing multi-tasking and operates in conjunction with a scheduler to implement a particular type of scheduling system.

Trap and signal handler 40 is also depicted within operating system 12 and is utilized to respond to traps and signals typically activated by hardware system 14. Next, interrupt manager 42 is depicted. Interrupt manager 42 preferably manages interrupt handlers which are set up by the operating system kernel and kernel extensions to take whatever action is necessary to respond to the occurrence of an interrupt.

Loader system 44 is also depicted within operating system kernel 12 and, as those skilled in the art will appreciate, is typically a routine which loads programs, libraries and kernel extensions. Input/output buffers 46 are depicted within operating system kernel 12 and are utilized to temporarily store data during transfer from one device to another in order to compensate for possible differences in data flow rate.

Finally, a plurality of device drivers 48 are depicted. Device drivers 48 are typically utilized to attach and use various peripheral devices which may be coupled to data processing system 10. For example, displays, keyboards, printers, diskette drives, fixed disk drives and other auxiliary devices are typically controlled from data processing system 10 utilizing an associated device driver.

Next, in accordance with an important feature of the present invention, scheduler 52 is depicted. Scheduler 52 is preferably designed to allocate processor time to specific tasks within data processing system 10. As those skilled in the art will appreciate, schedulers are necessary in order to allow various tasks to effectively utilize resources within data processing system 10.

Various types of schedulers are known in the prior art including real time and time sharing schedulers. One example of a time sharing scheduler policy is First-Come, First-Serve scheduling, in which the first task presented to the processing unit is the first task scheduled. While such schedulers are simple to implement, they may cause inefficiencies within the system as short duration tasks may be pending for long periods of time while awaiting conclusion of a long duration task.

This problem is overcome in some applications by utilizing a Shortest-Job-First scheduling algorithm; however, this scheduler is difficult to implement in view of the necessity of predicting the length of each task prior to performing the task. While this scheduler provides the shortest average waiting time for job completion, the difficulty in implementing this type of scheduling process limits its utilization to those systems or applications in which task length is easily determinable.

Round-Robin scheduling is also known in the art. Round-Robin scheduling is a preemptive algorithm in which processor time and other resource allocations are sequentially dedicated to each task within a ready queue, in a predetermined rotation. Multiple queue algorithms are also often utilized by schedulers in that they permit different algorithms to be utilized for different classes of tasks. Thus, it should be apparent that the wide variety of scheduling algorithms tends to make it difficult to optimize a selected operating system for a particular application, if that operating system is limited to a particular type of scheduler.

Thus, in accordance with an important feature of the present invention, scheduler 52 is preferably one of multiple diverse user selectable schedulers, such as those depicted at reference numerals 52A, 52B and 52C. As discussed above, scheduler 52A may comprise a time sharing scheduler, such as a First-Come, First-Serve scheduler, while scheduler 52B may comprise a Shortest-Job-First scheduler. Similarly, scheduler 52C may comprise a real time scheduler. By providing a plurality of diverse user selectable schedulers stored within local or remote media, such as a magnetic disk, in the manner depicted within FIG. 1, the user of data processing system 10 may select a particular scheduler which will optimize utilization of system resources for a particular set of applications. However, the utilization of installable schedulers in the manner depicted herein requires that a scheduler interface 50 be created within operating system kernel 12.

By providing the capability of utilizing various diverse user selectable schedulers in the manner depicted herein, operating system kernel 12 must be modified to include a standardized interface within operating system kernel 12 which may be utilized to provide the interfaces required between scheduler 52 and operating system kernel 12. In the depicted embodiment of the present invention, the standardized interface is preferably provided utilizing a kernel extension mechanism. Kernel extension mechanisms are well known in the art and are typically utilized to dynamically load device drivers and file systems within an operating system kernel. As illustrated within FIG. 1, scheduler interface 50 preferably includes interfaces to process/task management system 28, boot/initialization system 30, memory management system 32, trap/signal handler 40 and processor 20; however, interfaces may be provided to all kernel components, and indirectly to non-kernel components. Additionally, an interface may also be provided to applications via the operating system kernel utilizing a system call.

The interface between an installable scheduler and process/task management system 28 is obviously necessary as scheduler 52 will be utilized to allocate processor time to various tasks within data processing system 10 in accordance with the scheduling algorithm selected by the user for optimization of resource allocations for a particular set of applications. Similarly, boot/initialization system 30 will be required for the interface with scheduler 52 in that when a scheduler is first loaded the operating system kernel 12 will need to pass information to the scheduler and the scheduler will return information to the operating system kernel, permitting the scheduler 52 to initialize itself. An interface to memory management system 32 is also provided in the depicted embodiment of the present invention as scheduler 52 will need to allocate and deallocate memory for internal data structures within scheduler 52. Further, memory allocated for internal data structures for scheduler 52 may need to be locked in place utilizing memory management system 32 in order to avoid swapping during scheduling.

Interrupt manager 42 is also preferably coupled to scheduler interface 50 in order to interact with scheduler 52 when interrupts occur to notify scheduler 52 of clock ticks and other events which may affect scheduling, in a manner which is common to those having experience with scheduler mechanisms. Additionally, trap/signal handler 40 is also provided within scheduler interface 50 to permit external events generated within hardware system 14 to effect the initiation and termination of programs or applications by scheduler 52. Finally, an interface must necessarily be provided to dispatcher 38, so that the initiation and termination of various tasks utilizing processor 20 may be controlled in a similar manner to known fixed scheduler systems.

Finally, an installable scheduler interface 54 is also depicted as stored in association with each installable scheduler within FIG. 1. This interface is for the benefit of operating system kernel 12 and must be provided by each installable scheduler which may be utilized within data processing system 10, in accordance with the method and system of the present invention. Typically, the interfaces provided by installable scheduler 54 are in the following areas: initialization; priority setting; policy setting; thread or process creation, deletion and status change; event notification; processor selection; clock notification; and, next runner selection. As those skilled in the art will appreciate, certain of the interfaces provided are unnecessary for a particular scheduler; however, each interface must implement a so-called "stub" routine for those interfaces necessary for calls which may be inappropriate for selected environments.

As depicted in FIG. 1, multiple diverse user selectable installable schedulers 52A, 52B and 52C are depicted and are preferably stored on local or remote media, such as magnetic disk storage.

Finally, it will be necessary to slightly modify loader system 44 to permit the loader to access and install a selected one of the multiple diverse user selectable schedulers provided. This is essentially the same process as is typically utilized by loader 44 to load an installable file system or device driver and merely involves the reading of the file, the performing of fix ups and relocations and the resolving of imports and exports in a manner well known to those skilled in the art.

Specific details of each of the aforementioned interfaces are not set forth herein as they will differ greatly in response to the type of schedulers utilized and the operating system chosen; however, it is considered well within the skill of a person of ordinary skill in this art to create such interfaces upon reference to the present specification.

Figure 2:
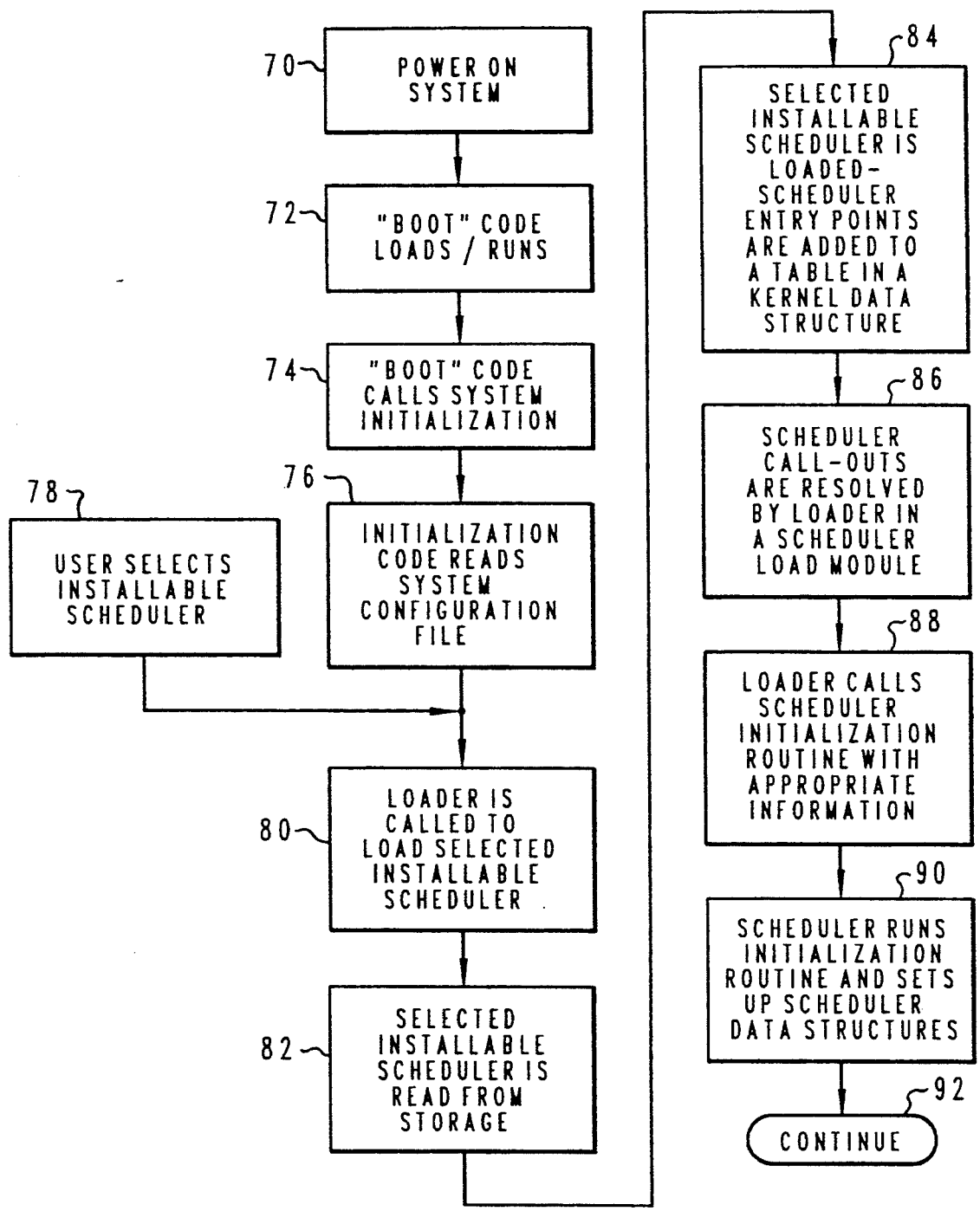
FIG. 2 is a high level block diagram illustrating a software implementation of the initialization of a data processing system incorporating the method and system of the present invention.

Referring now to FIG. 2, there is depicted a high level logic flowchart which illustrates a software implementation of the present invention. As depicted, one aspect of the system begins at block 70, which illustrates the provision of power to data processing system 10. Thereafter, as depicted at block 72, the "boot" or initialization code loads and runs.

Next, the process passes to block 74 which illustrates the calling of the system initialization file for the data processing system in question. Block 76 illustrates the reading of the system configuration file by the initialization system and thereafter, the process passes to block 80 which depicts the calling of loader 44 (see FIG. 1) to load a user selected installable scheduler.

As illustrated within FIG. 2, the process may also begin at block 78 in which a user selects a particular installable scheduler during a period of time when data processing system 10 is already in operation. For purposes of this explanation, the term "user" may mean a person utilizing a data processing system, or an application or process utilizing a data processing system. In either event, after calling loader 44 to load the particular selected installable scheduler which has been chosen by the user, the process passes to block 82.

Block 82 illustrates the reading of the selected scheduler from storage on local or remote media such as magnetic disk storage. Next, the process passes to block 84, which illustrates the loading of the user selected installable scheduler and the addition of the entry points of that scheduler to a table within the operating system kernel data structure.

Next, scheduler call-outs are resolved by the loader in a scheduler load module. The process then passes to block 88 which depicts the calling of the scheduler initialization routine, with appropriate information necessary to initialize a scheduler 52 within operating system kernel 12. During scheduler initialization scheduler 52 performs whatever initialization is required including the setting up of data structures, as depicted at block 90 and thereafter, the process continues, as depicted at block 92.

Those skilled in the art will appreciate that if a selected installable scheduler has been automatically selected for utilization in response to system initialization at this point system initialization will continue; however, if the system has already been initialized and the user has selected a different installable scheduler for utilization with a particular application, the process will return to the point from which the user selected the scheduler.

Upon reference to the foregoing those skilled in the art will appreciate that the Applicants herein have created an enhanced operating system and data processing system wherein one of a plurality of user selectable installable schedulers may be selected, in order to optimize allocation of system resources for a particular application. By utilizing a kernel extension mechanism to provide a standardized interface between multiple user selectable installable schedulers and the operating system kernel, the scheduler for a particular operating system may be efficiently and automatically altered to optimize the efficiency of the data processing system.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for permitting high concurrency of access to designated data stored within a storage subsystem comprising a plurality of storage devices which are coupled to said data processing system via a storage device control unit having subsystem memory therein, wherein data within each of said plurality of storage devices may be accessed from said data processing system utilizing one of a plurality of unique control blocks which each identify a selected storage device and permit only one application to access said selected storage device concurrently and an associated data retrieval command sequence which identifies data to be accessed within said selected storage device, said method comprising the steps of:
copying at least a portion of said designated data from a first storage device to said subsystem memory within said storage device control unit;
selecting a unique control block which identifies a second storage device; and
associating a selected data retrieval command sequence with said selected unique control block which identifies said portion of said designated data as located within said subsystem memory wherein alternate data within said first storage device may be concurrently accessed utilizing a unique control block which identifies said first storage device.

2. The method of enhancing efficiency in a data processing system according to claim 1, wherein said step of selectively installing a user selected particular one of said plurality of diverse user selectable schedulers within said operating system comprises the step of automatically installing a user selected particular one of said plurality of diverse user selectable schedulers within said operating system during system initialization of said data processing system.

3. The method of enhancing efficiency in a data processing system according to claim 1, wherein said step of selectively installing a user selected particular one of said user selected plurality of diverse user selectable schedulers within said operating system further includes the step of selectively replacing said particular one of said plurality of diverse user selectable schedulers with a second user selected one of said plurality of diverse user selectable schedulers during operation of said data processing system in response to a user input.

4. The method of enhancing efficiency in a data processing system according to claim 1, wherein said operating system includes a kernel and wherein said step of establishing a standardized interface within said operating system comprises providing a kernel extension mechanism.

5. A method of enhancing flexibility in a multitasking data processing system having at least one processor and multiple resources including memory, said method comprising the data processing system implemented steps of:
establishing an operating system within said data processing system without an installed scheduler for allocating processor time;
establishing a standardized interface for a scheduler within said operating system, said scheduler to be utilized to allocate processor time;
establishing a plurality of independent and diverse schedulers in said memory, said schedulers being user selectable, wherein after a scheduler is user selected, said user selected scheduler is installed within the operating system;
wherein the flexibility of said data processing system is enhanced through the ability of the user to select from said plurality of user selectable schedulers thereby being able to control the allocating of processor time.

6. The method for enhancing flexibility in a data processing system according to claim 5, wherein said operating system includes a kernel and wherein said step of establishing a standardized interface for a scheduler comprises providing a kernel extension mechanism within said operating system kernel.

7. A data processing system having at least one processor, an operating system kernel and multiple resources including memory, which are managed by said operating system kernel, said improved data processing system comprising:
a kernel extension mechanism within said operating system kernel for providing a standardized interface between said operating system kernel and a scheduler to be utilized to allocate processor time within said data processing system;
a plurality of diverse user selectable schedulers; and
means for selectively installing a user selected particular one of said plurality of diverse user selectable schedulers within said operating system kernel for utilization with a selected set of applications wherein processor time may be more efficiently allocated for said set of selected applications.

8. The data processing system according to claim 7, wherein said means for selectively installing a user selected particular one of said plurality of diverse user selectable schedulers within said operating system kernel comprises means for automatically installing a user selected particular one of said plurality of diverse user selectable schedulers within said operating system kernel during system initialization of said data processing system.

9. A data processing system for permitting high concurrency of access to designated data stored within a storage subsystem comprising a plurality of storage devices which are coupled to said data processing system via a storage device control unit having subsystem memory therein, wherein data within each of said plurality of storage devices may be accessed from said data processing system utilizing one of a plurality of unique control blocks which each identify a selected storage device and permit only one application to access said selected storage device concurrently and an associated data retrieval command sequence which identifies data to be accessed within said selected storage device, said data processing system comprising:

means for copying at least a portion of said designated data from a first storage device to said subsystem memory within said storage device control unit;

means for selecting a unique control block which identifies a second storage device; and means for associating a selected data retrieval command sequence with said selected unique control block which identifies said portion of said designated data as located within said subsystem memory wherein alternate data within said first storage device may be concurrently accessed utilizing a unique control block which identifies said first storage device.

10. An operating system for utilization in a multiprocessing data processing system having at least one processor and multiple resources including memory, said operating system comprising:

an operating system kernel;

a kernel extension mechanism within said operating system kernel for providing a standardized interface between said operating system kernel and a scheduler to be utilized to allocate processor time within said data processing system; and a plurality of independent and diverse schedulers stored within said memory, said schedulers each having a different task scheduling effect;

wherein a selected one of said plurality of user selectable schedulers may be installed within said operating system kernel such that a user may optimize allocation of processor time within said data processing system for a selected set of applications.

* * * * *